T. J. BOOZER.
HOE ATTACHMENT FOR DRILLS.
APPLICATION FILED APR. 18, 1910.
970,298.
Patented Sept. 13, 1910.
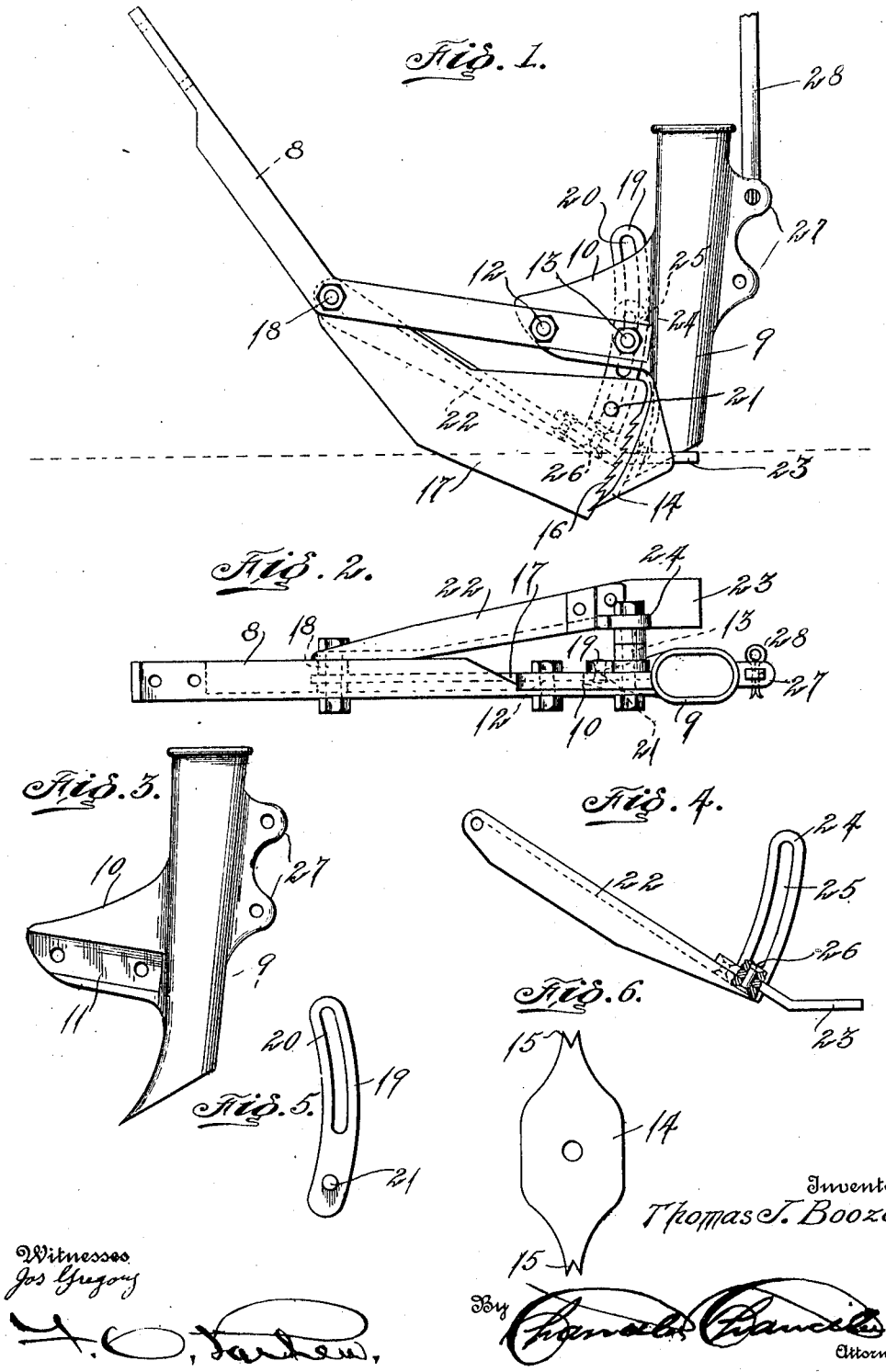

UNITED STATES PATENT OFFICE.

THOMAS J. BOOZER, OF ROSALIA, WASHINGTON.

HOE ATTACHMENT FOR DRILLS.

970,298.  Specification of Letters Patent.  Patented Sept. 13, 1910.

Application filed April 18, 1910. Serial No. 556,061.

*To all whom it may concern:*

Be it known that I, THOMAS J. BOOZER, a citizen of the United States, residing at Rosalia, in the county of Whitman, State of Washington, have invented certain new and useful Improvements in Hoe Attachments for Drills; and I do hereby declare the following to be a full, clear, and exact description of the invention, such as will enable others skilled in the art to which it appertains to make and use the same.

The invention relates to a drill attachment and more particularly to the class of hoes for drill machines.

The primary object of the invention is the provision of an attachment of this character in which there is employed a hoe that will not become clogged with trash, weeds or the like, and that may be adjusted so as to cut into the ground a uniform depth for the depositing of seed from a seed spout when the drill is being advanced through a field.

Another object of the invention is the provision of an attachment of this character in which the hoe may be readily and conveniently detached, whereby it may be sharpened and that will not clog with weeds or the like and also will enable the grain from a drill to be planted in the ground a uniform depth.

A further object of the invention is the provision of an attachment in which the cutting hoe for the formation of an open furrow is so mounted in advance of the delivery spout of a seed drill that the said spout will be held whereby it will be lifted over stubble and weeds without the possibility of the same becoming clogged or wrapped about the delivery spout of the drill.

A still further object of the invention is the provision of an attachment of this character which is simple in construction, thoroughly reliable and efficient in operation and inexpensive in the manufacture.

With these and other objects in view the invention consists in the construction, combination and arrangement of parts as will be hereinafter more fully described, illustrated in the accompanying drawings, disclosing the preferred form of embodiment of the invention and pointed out in the claims hereunto appended.

In the drawings:—Figure 1 is a side elevation of the attachment mounted upon the delivery spout of a drill. Fig. 2 is a top plan view thereof. Fig. 3 is a side elevation of the delivery spout of a drill. Fig. 4 is a side elevation of the gage shoe for the hoe. Fig. 5 is a detail view of one of the brackets. Fig. 6 is a rear elevation of the reversible spout point.

Similar reference characters indicate corresponding parts throughout the several views in the drawings.

Referring to the drawings by numerals 8 designates an angle beam the forward end of which is adapted to be connected to the frame of a drill in the usual manner and to the opposite rear end is attached the seed delivery spout 9 of the drill the latter being formed with a forward wing 10 provided with a recess 11 correspondingly shaped to and receiving the rear end of the said beam 8, the latter being connected to the said wing by means of bolt members 12 and 13 and at the lower end of this delivery spout 9 is arranged a reversible plow point 14 formed with forwardly curved split noses 15 one of which engages rack teeth 16 formed at the rear edge of a vertical cutting hoe 17 the same being connected at its forward end to the beam 8 by means of a detachable pivot 18 which permits the ready and easy attachment of the hoe when required. At the side of the wing opposite its side connected with the beam 8 is disposed a sector shaped member 19 containing an arcuate slot 20 through which is passed the bolt 13 and also engaged in the lower end of this member 19 is a rivet 21 projecting from one side face of the hoe 17 which connects the sector member 19, to the hoe and by means of the bolt 13 the said hoe may be adjusted relative to the lower end of the delivery spout 9 of the drill.

Attached to the beam 8 at one side thereof by means of the pivot 18 is the forward end of a rearwardly inclined leg or standard 22 to the rear end of which is connected a foot or shoe 23 the latter adapted to slide upon the upper surface of the ground when the drill is being advanced through a field, and thereby maintain the hoe 17 a predetermined depth in the ground when the drill is being operated. To this foot is connected a sector shaped member 24 having an arcuate shaped slot 25 in which is engaged the bolt 13 whereby the member 24 may be locked in adjusted position the lower end of the member being bent at right angles and secured to the shoe by means of a rivet 26.

Extending rearwardly from the spout 9 are spaced parallel ears 27 to one of which is pivotally connected a lift bar 28 of the drill machine and the remaining ear 27 being adapted to receive the usual drag chain.

It is apparent that the bolt 13 carrying the usual nut forms a common connection for the segment shaped members 19 and 24 whereby they may be adjusted for regulating the hoe and the gage shoe which latter maintains the hoe in position to cut into the ground at uniform depth.

What is claimed is:—

1. The combination with a drill spout supporting beam, of a drill spout fixed at one end thereto, a reversible point carried at the lower end of the spout, a vertical hoe blade pivoted to said beam and having adjustable connection with said point, and an adjustable shoe connected with said beam to regulate the depth of cutting action of the hoe.

2. The combination with a supporting beam, of a drill tube connected thereto, a hoe blade vertically disposed forwardly of the tube, means for adjusting the blade relative to the lower end of the tube and gage means connected with said beam for regulating the depth of cutting action of the hoe.

3. The combination with a supporting beam, of a drill tube connected to one end thereof, a reversible point detachably connected to the lower end of the tube, a hoe blade vertically disposed beneath the beam and having rack teeth formed at its rear end engaged by one end of the point and means for limiting the depth of cutting action of the blade.

4. The combination with a supporting beam, of a drill tube connected to one end thereof, a reversible point detachably connected to the lower end of the tube, a hoe blade vertically disposed beneath the beam and having rack teeth formed at its rear end engaged by one end of the point, means for limiting the depth of cutting action of the blade, and means for adjusting said last named means.

5. The combination with a supporting beam, of a drill tube connected to one end thereof, a reversible point detachably connected to the lower end of the tube, a hoe blade vertically disposed beneath the beam and having rack teeth formed at its rear end engaged by one end of the point, means for limiting the depth of cutting action of the blade, means for adjusting said last named means, and means for adjusting the said blade.

In testimony whereof, I affix my signature, in presence of two witnesses.

THOMAS J. BOOZER.

Witnesses:
 CHAS. BROOKS,
 D. L. DUTTON.